US008869107B2

(12) United States Patent
Taylor et al.

(10) Patent No.: US 8,869,107 B2
(45) Date of Patent: Oct. 21, 2014

(54) DECLARATIVE DYNAMIC CONTROL FLOW IN CONTINUATION-BASED RUNTIME

(75) Inventors: John A. Taylor, Bellevue, WA (US);
Leon E. Welicki, Issaquah, WA (US);
Kenneth D. Wolf, Seattle, WA (US);
Justin D. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 24 days.

(21) Appl. No.: 13/349,261

(22) Filed: Jan. 12, 2012

(65) Prior Publication Data

US 2013/0185694 A1     Jul. 18, 2013

(51) Int. Cl.
*G06F 9/44*     (2006.01)
*G06N 5/02*     (2006.01)

(52) U.S. Cl.
USPC .............. 717/117; 717/107; 717/104; 706/46

(58) Field of Classification Search
CPC .............. G06F 8/10; G06F 8/20; G06F 8/24; G06F 8/34
See application file for complete search history.

(56) References Cited

U.S. PATENT DOCUMENTS

| 7,631,291 B2 * | 12/2009 | Shukla et al. ................. 717/107 |
| 7,739,136 B2 | 6/2010 | Chang et al. |
| 8,397,216 B2 * | 3/2013 | Frank et al. .................... 717/117 |
| 2007/0239498 A1 | 10/2007 | Shukla et al. |
| 2007/0239499 A1 | 10/2007 | Shukla et al. |
| 2007/0239505 A1 | 10/2007 | Shukla et al. |
| 2008/0052314 A1 | 2/2008 | Batabyal |
| 2008/0320486 A1 | 12/2008 | Bose et al. |
| 2009/0222789 A1 | 9/2009 | Frank et al. |
| 2009/0249293 A1 | 10/2009 | Davies |
| 2010/0153930 A1 * | 6/2010 | Lambert et al. ............... 717/139 |
| 2010/0191930 A1 * | 7/2010 | Groff et al. .................... 711/170 |
| 2010/0293538 A1 | 11/2010 | Wolf et al. |
| 2010/0299300 A1 * | 11/2010 | Wolf et al. ...................... 706/46 |
| 2010/0306000 A1 | 12/2010 | Green et al. |

OTHER PUBLICATIONS

Benatallah, et al., "Declarative Composition and Peer-to-Peer Provisioning of Dynamic Web Services", Retrieved at <<http://ieeexplore.ieee.org/stamp/stamp.jsp?tp=&arnumber=994738>>, Proceedings of the International Conference on Data Engineering (ICDE), Feb. 2002, pp. 297-308.
International Search Report and Written Opinion received for PCT Patent Application No. PCT/US2013/020715, mailed on Apr. 29, 2013, 9 pages.

* cited by examiner

*Primary Examiner* — Don Wong
*Assistant Examiner* — Mohammad Kabir
(74) *Attorney, Agent, or Firm* — Ben Tabor; Kate Drakos; Micky Minhas

(57) ABSTRACT

Techniques are described herein that are capable of executing a computer program in accordance with a declarative dynamic control flow in a continuation-based runtime. A declarative dynamic control flow identifies a set of continuations. A representation of logic that corresponds to the declarative dynamic control flow is provided in accordance with execution of the computer program in the continuation-based runtime. The declarative dynamic control flow identifies a set of continuations. Each continuation identifies a respective rule, which defines a respective event, and a respective action, which is to be performed upon occurrence of the respective event. A determination is made that a specified event occurs. The set of continuations is dynamically modified based on occurrence of the specified event.

20 Claims, 5 Drawing Sheets

DECLARATIVE DYNAMIC CONTROL FLOW IN CONTINUATION-BASED RUNTIME

BACKGROUND

A runtime is a software component that supports execution of computer programs written in a designated computer programming language. A continuation-based runtime models computer programs in terms of units of execution (e.g., activities) that abstract particular semantics of a given domain. These semantics may refer to basic control flow, primitives, or higher-level business functions. Such primitives often are of a generic nature, and such business functions often are domain-specific and/or business-specific. One example use of a continuation-based runtime is modeling of human workflows that represent business processes. Business processes commonly change to accommodate the ever-changing business environment and therefore generally are viewed as being intrinsically dynamic. A common requirement of business processes is the capability to make decisions dynamically in a data driven fashion. For example, a list of approvers selected to approve a corporate purchase may vary in time according to external conditions of the business (e.g., an approver may become ill, a new manager may be hired in a business unit associated with the purchase, etc.).

Programming structures, such as control flows, in a continuation-based runtime that are targeted to a declarative and visual programming experience have several challenges to support making decisions dynamically in a data driven fashion. Such a programming structure often is naturally static because the physical layout in the visualization has some form of direct coupling with the program execution flow. In one example, the dynamic addition of branches to a parallel primitive programming construct may be difficult to express in a two-dimensional visual canvas. In accordance with this example, the branches to be added may not be known at the time at which the parallel primitive programming construct is designed. In further accordance with this example, another set of constructs may be added to the parallel primitive programming construct to respond to administrative events.

When a programming structure that is targeted to a declarative and visual programming experience is modeled using existing primitives, the resulting model may be relatively complex, difficult to generate, and/or incomplete. For instance, the resulting model may not have access to subtle and fine-grain control flow aspects because the model may not provide a way to control the programming structure. In one example, the model may not provide a way to allow external users to manipulate a list of approvers, cancel, etc. Modeling a programming structure manually to react to (and handle) business events and administrative events may be relatively difficult, error prone, and/or not possible.

SUMMARY

Various approaches are described herein for, among other things, executing a computer program in accordance with a declarative dynamic control flow in a continuation-based runtime. A declarative dynamic control flow identifies a set of continuations. Each continuation identifies a respective rule, which defines a respective event, and a respective action, which is to be performed upon occurrence of the respective event. A continuation-based runtime is a runtime that is configured to support continuations, including those in the set of continuations that is identified by the declarative dynamic control flow. Events that are defined by rules identified by dynamic continuations in the set of continuations are referred to as "business events". Events that are not defined by rules identified by dynamic continuations in the set of continuations are referred to as "administrative events" or "out-of-band events". For example, an out-of-band event may be an event that is defined by a rule identified by a static continuation in the set of continuations. In another example, an out-of-band event may be an event that is not defined by a rule identified by a continuation in the set of continuations, regardless whether the continuation is static or dynamic.

A method is described for executing a computer program in accordance with a declarative dynamic control flow in a continuation-based runtime. According to the method, a representation of logic that corresponds to the declarative dynamic control flow is provided in accordance with execution of the computer program in the continuation-based runtime. The declarative dynamic control flow identifies a set of continuations. The continuations in the set identify respective rules that define respective events and further identify respective actions that are to be performed upon occurrence of the respective events. A determination is made that a specified event occurs. The set of continuations is dynamically modified based on occurrence of the specified event. The specified event may be a business event or an administrative event.

A system is described that includes a provision module, a determination module, and a modification module. The provision module is configured to provide a representation of logic that corresponds to a declarative dynamic control flow in accordance with execution of a computer program in a continuation-based runtime. The declarative dynamic control flow identifies a set of continuations. Each continuation in the set identifies a respective rule that defines a respective event and further identifies a respective action that is to be performed upon occurrence of the respective event. The determination module is configured to determine whether a specified event occurs. The modification module is configured to dynamically modify the set of continuations in response to occurrence of the specified event.

A computer program product is described that includes a computer-readable medium having computer program logic recorded thereon for enabling a processor-based system to execute a computer program in accordance with a declarative dynamic control flow in a continuation-based runtime. The computer program product includes first, second, and third program logic modules. The first program logic module is for enabling the processor-based system to provide a representation of logic that corresponds to a declarative dynamic control flow in accordance with execution of a computer program in a continuation-based runtime. The declarative dynamic control flow identifies a set of continuations. Each continuation in the set identifies a respective rule that defines a respective event and further identifies a respective action that is to be performed upon occurrence of the respective event. The second program logic module is for enabling the processor-based system to determine whether a specified event occurs. The third program logic module is for enabling the processor-based system to dynamically modify the set of continuations in response to occurrence of the specified event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
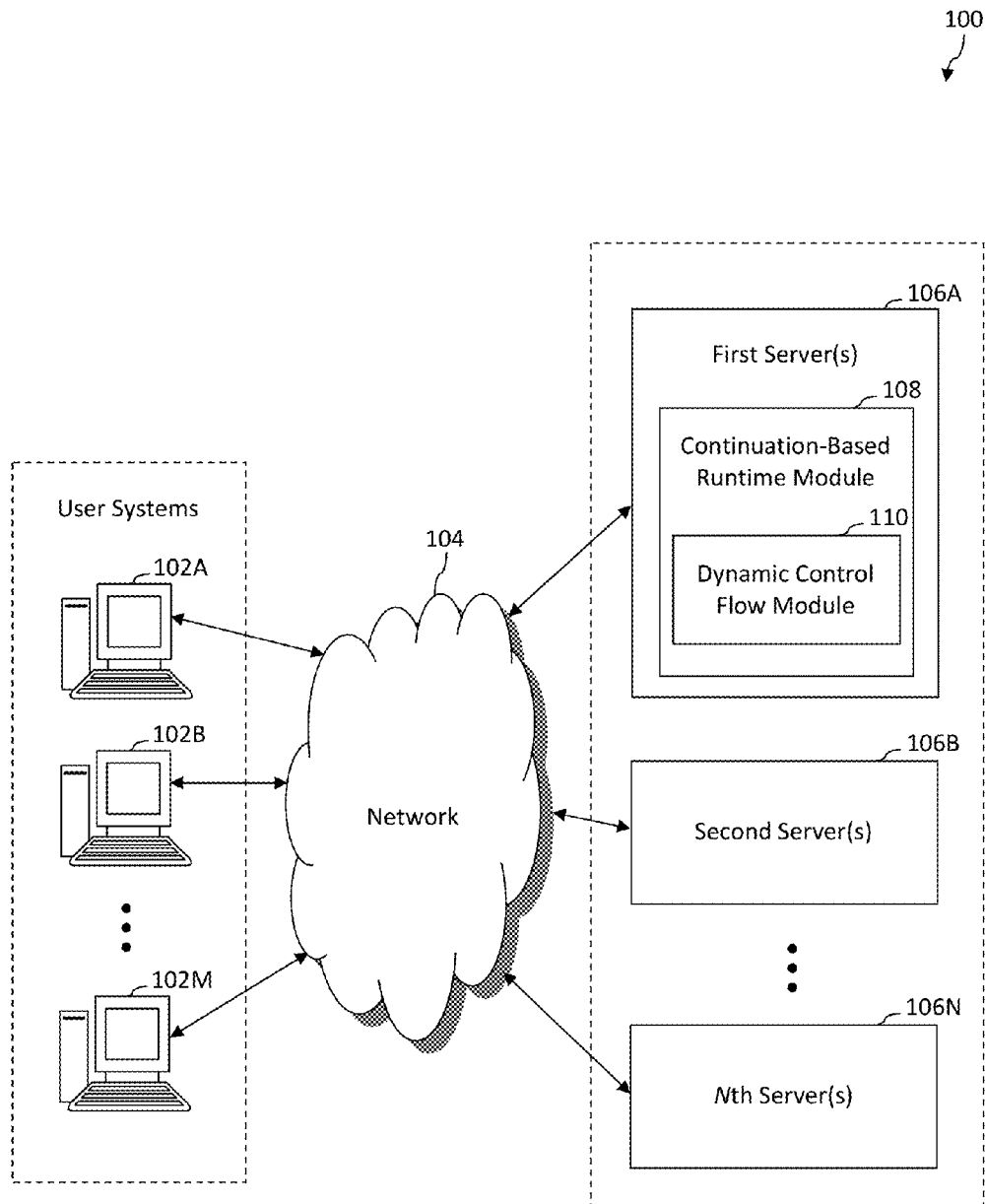
FIG. 1 is a block diagram of an example computer system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of executing a computer program in accordance with a declarative dynamic control flow in a continuation-based runtime. A declarative dynamic control flow identifies a set of continuations. Each continuation identifies a respective rule, which defines a respective event, and a respective action, which is to be performed upon occurrence of the respective event. A continuation-based runtime is a runtime that is configured to support continuations, including those in the set of continuations that is identified by the declarative dynamic control flow. Events that are defined by rules identified by dynamic continuations in the set of continuations are referred to as "business events". Events that are not defined by rules identified by dynamic continuations in the set of continuations are referred to as "administrative events" or "out-of-band events". For example, an out-of-band event may be an event that is defined by a rule identified by a static continuation in the set of continuations. In another example, an out-of-band event may be an event that is not defined by a rule identified by a continuation in the set of continuations, regardless whether the continuation is static or dynamic.

Example techniques described herein have a variety of benefits as compared to conventional techniques for executing a computer program. For instance, the example techniques may provide a declarative programming abstraction that supports a declarative and visual programming experience. Example techniques may be capable of executing such a declarative programming abstraction while monitoring for both business events and administrative events. This may provide an opportunity to modify an events vector, including events defined by rules that are identified by continuations, which are identified by a declarative dynamic control flow. The declarative programming abstraction may have access to fine-grain aspects of the declarative dynamic control flow, such as cancellation. Inclusion of such a declarative programming abstraction in a process may render the process easier to analyze.

FIG. 1 is a block diagram of an example computer system 100 in accordance with an embodiment. Generally speaking, computer system 100 operates to provide information to users in response to requests (e.g., hypertext transfer protocol (HTTP) requests) that are received from the users. The information may include documents (e.g., Web pages, images, video files, etc.), output of executables, and/or any other suitable type of information. In accordance with example embodiment described herein, computer system 100 executing a computer program in accordance with a declarative dynamic control flow in a continuation-based runtime in response to such requests from the users. Detail regarding techniques for executing a computer program in accordance with a declarative dynamic control flow in a continuation-based runtime is provided in the following discussion.

As shown in FIG. 1, computer system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program using a client (e.g., a Web browser, Web crawler, or other type of client) deployed on a user system 102 that is owned by or otherwise accessible to the user. In accordance with some example embodiments, user systems 102A-

102M are capable of accessing domains (e.g., Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a desktop computer, a laptop computer, a tablet computer, a personal digital assistant, a cellular telephone, or the like.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, video files, etc.), output of executables, or any other suitable type of information. In accordance with some example embodiments, servers 106A-106N are configured to host respective Web sites, so that the Web sites are accessible to users of computer system 100.

First server 106A is shown to include a continuation-based runtime module 108 for illustrative purposes. Continuation-based runtime module 108 is configured to provide a continuation-based runtime that supports a set of continuations that is identified by a declarative dynamic control flow.

Continuation-based runtime module 108 includes dynamic control flow module 110. Dynamic control flow module 110 is configured to execute a computer program in accordance with the declarative dynamic control flow in the continuation-based runtime. Some example techniques for executing a computer program in accordance with a declarative dynamic control flow in a continuation-based runtime are discussed in greater detail below with reference to FIGS. 2-5.

Continuation-based runtime module 108 and dynamic control flow module 110 are shown to be incorporated in first server(s) 106A for illustrative purposes and are not intended to be limiting. It will be recognized that continuation-based runtime module 108 and dynamic control flow module 110 (or any portion thereof) may be incorporated in any one or more of the user systems 102A-102M. For example, client-side aspects of continuation-based runtime module 108 and/or dynamic control flow module 110 may be incorporated in one or more of the user systems 102A-102M, and server-side aspects of continuation-based runtime module 108 and/or dynamic control flow module 110 may be incorporated in first server(s) 106A. In another example, continuation-based runtime module 108 and dynamic control flow module 110 may be distributed among the user systems 102A-102M. In another example, continuation-based runtime module 108 and dynamic control flow module 110 may be incorporated in a single one of the user systems 102A-102M.

Dynamic control flow module 110 may be implemented in various ways to execute a computer program in accordance with a declarative dynamic control flow in a continuation-based runtime, including being implemented in hardware, software, firmware, or any combination thereof. For example, dynamic control flow module 110 may be implemented as computer program code configured to be executed in one or more processors. In another example, dynamic control flow module 110 may be implemented as hardware logic/electrical circuitry. In an embodiment, dynamic control flow module 110 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
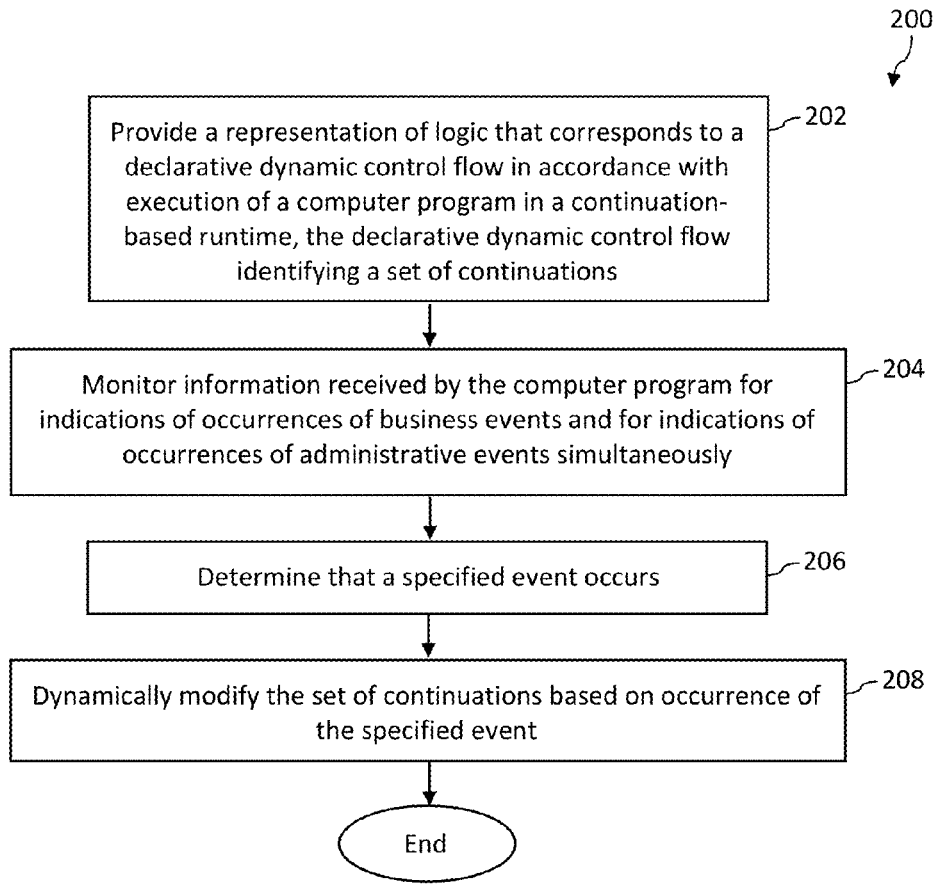
FIGS. 2-4 depict flowcharts of example methods for executing a computer program in accordance with a declarative dynamic control flow in a continuation-based runtime, according to embodiments.
Figure 3:
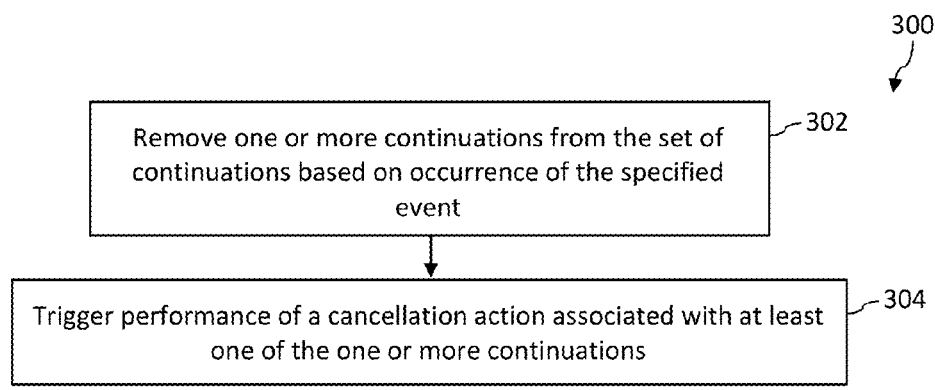
Figure 4:
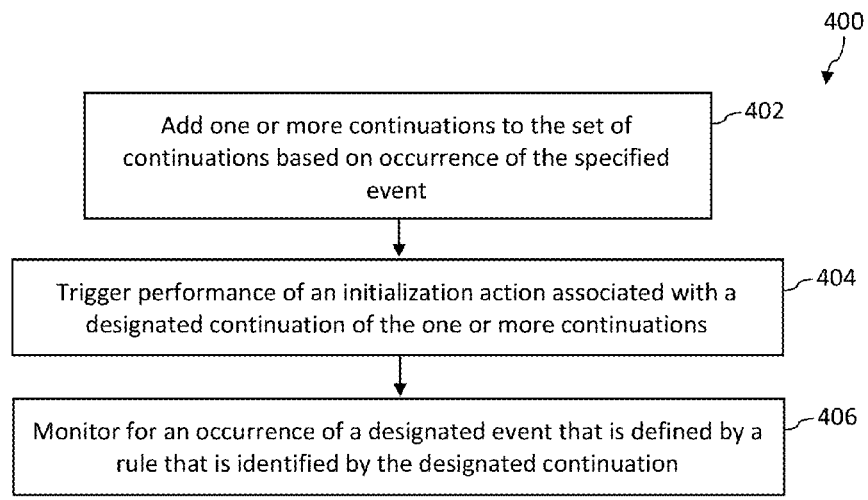
Figure 5:
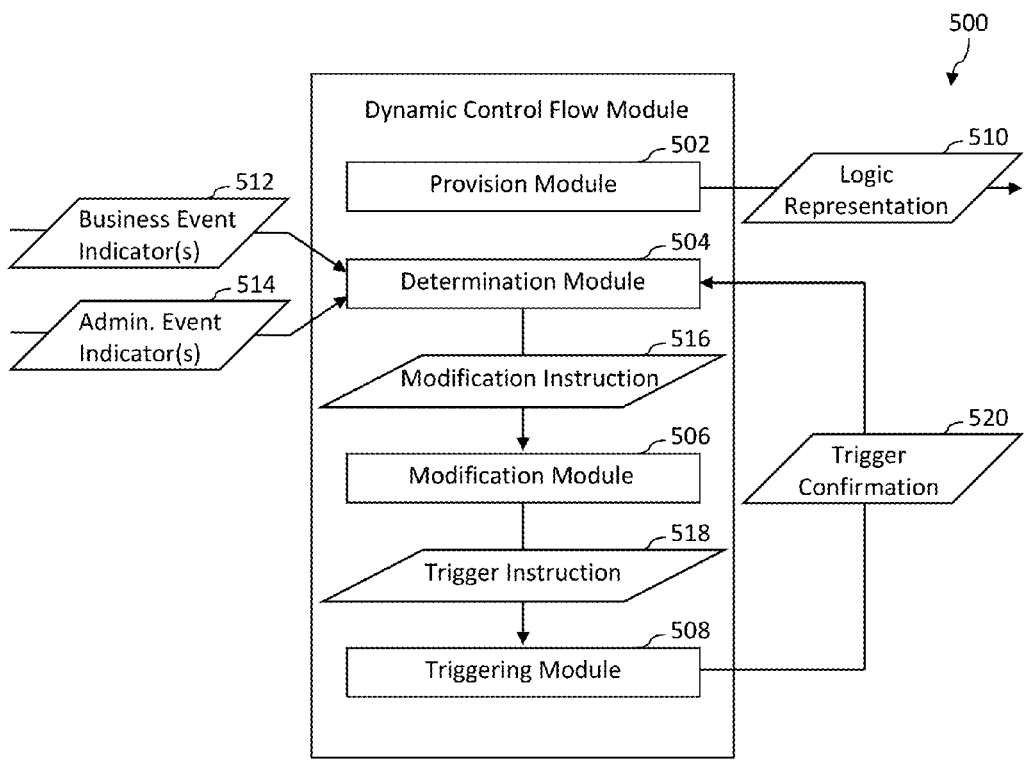
FIG. 5 is a block diagram of an example implementation of a dynamic control flow module shown in FIG. 1 in accordance with an embodiment.

FIGS. 2-4 depict flowcharts 200, 300, and 400 of example methods for executing a computer program in accordance with a declarative dynamic control flow in a continuation-based runtime, according to embodiments. Flowcharts 200, 300, and 400 may be performed by dynamic control flow module 110 of system 100 shown in FIG. 1, for example. For illustrative purposes, flowcharts 200, 300, and 400 are described with respect to dynamic control flow module 500 shown in FIG. 5, which is an example of dynamic control flow module 110, according to an embodiment. As shown in FIG. 5, dynamic control flow module 500 includes a provision module 502, a determination module 504, a modification module 506, and a triggering module 508. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, a representation of logic that corresponds to a declarative dynamic control flow is provided in accordance with execution of a computer program in a continuation-based runtime. The declarative dynamic control flow identifies a set of continuations. Each continuation in the set identifies a respective rule that defines a respective event and a respective action that is to be performed upon occurrence of the respective event. It will be recognized that the respective rule and the respective action in each continuation may be defined by an author of the computer program, though the scope of the example embodiments is not limited in this respect. An action may be a simple action or a compound action. A simple action is a single action. A compound action is a combination of multiple actions. The representation of the logic may be a graphical representation, a text-based representation, other suitable type of representation, or any combination thereof. For instance, a graphical representation may be a two-dimensional (2D) representation or a three-dimensional (3D) representation. In an example implementation, provision module 502 provides logic representation 510, which corresponds to the declarative dynamic control flow, in accordance with execution of the computer program in the continuation-based runtime.

At step 204, information received by the computer program is monitored for indications of occurrences of business events and for indications of occurrences of administrative events simultaneously. In an example implementation, determination module 504 monitors the information for business event indicator(s) 512 and for administrative event indicator(s) 514 simultaneously. Each of the business event indicator(s) 512 indicates an occurrence of a business event. Each of the administrative event indicator(s) 514 indicates an occurrence of an administrative event.

At step 206, a determination is made that a specified event occurs. The specified event may be a business event or an administrative event. A business event is an event that is defined by a rule that is identified by a dynamic continuation in the set of continuations. An administrative event is an event that is defined by a rule associated with the declarative dynamic control flow but that is not defined by a rule that is identified by a dynamic continuation in the set of continuations. In an example implementation, determination module 504 determines that the specified event occurs. For instance, determination module 504 may determine that the specified event occurs based on receipt of a business event indicator (e.g., any of business event indicator(s) 512) or an administrative event indicator (e.g., any of administrative event indicator(s) 514). In accordance with this implementation, determination module 504 may generate a modification instruction 516 that indicates that the specified event has occurred. For instance, the modification instruction 516 may instruct modification module to modify the set of continuations in response to (e.g., based on) occurrence of the specified event.

In an example embodiment, the logic is business logic. Accordingly, each continuation in the set of continuations may be a business continuation, and each event in the plurality of respective events may be a business event.

In another example embodiment, the logic is administrative logic. Accordingly, each continuation in the set of continuations may be an administrative continuation, and each event in the plurality of respective events may be an administrative event.

At step 208, the set of continuations is dynamically modified based on occurrence of the specified event. The set of continuations may be dynamically modified in any of a variety of ways. For instance, one or more continuations may be dynamically removed from the set of continuations and/or one or more continuations may be dynamically added to the set of continuations. Further discussion of removing continuation(s) from the set of continuations is provided below with reference to FIG. 3. Further discussion of adding continuation(s) to the set of continuations is provided below with reference to FIG. 4. In an example implementation, modification module 506 modifies the set of continuations. For instance, modification module 506 may modify the set of continuations in response to (e.g., based on) receipt of the modification instruction 516.

In an example embodiment, step 208 includes dynamically modifying a first subset of the continuations in the set of continuations and not a second subset of the continuations in the set of continuations. For example, one or more continuations in the first subset may be dynamically removed from the set of continuations, and/or one or more continuations may be dynamically added to the first subset. In accordance with this example, the continuation(s) that are included in the second subset are not dynamically modified. In one aspect of this example, step 208 may be atomic, such that dynamically removing continuation(s) in the first subset from the set of continuations and dynamically adding other continuation(s) to the first subset are either both performed or both not performed.

In accordance with this embodiment, the modification instruction 516 may indicate which of the continuations in the set of continuations are to be modified. For example, the modification instruction 516 may indicate that the first subset of the continuations in the set of continuations is to be dynamically modified. In further accordance with this embodiment, the modification instruction 516 may indicate that the second subset of the continuations in the set of continuations is not to be dynamically modified.

As described above with reference to step 202, each continuation in the set of continuations identifies a respective rule that defines a respective event. In an example embodiment, these events correspond to approval of common subject matter by a set of respective approvers. For instance, the approvers may be selected to approve publication of a document, payment of an expense, attendance of an employee at a conference, a vacation request, etc. In accordance with this embodiment, step 206 includes determining that the set of approvers is modified. For instance, a determination may be made at step 206 that one or more approvers are removed from the set of approvers and/or that one or more approvers are added to the set of approvers.

In one aspect of the aforementioned embodiment, determining that the set of approvers is modified includes determining that one or more first approvers and not one or more second approvers are removed from the set of approvers. In accordance with this aspect, step 208 includes removing one or more first continuations that correspond to the one or more respective first approvers but not one or more second continuations that correspond to the one or more respective second approvers from the set of continuations.

In another aspect of the aforementioned embodiment, determining that the set of approvers is modified includes determining that at least one approver is added to the set of approvers. In accordance with this aspect, step 208 includes adding at least one continuation that corresponds to the at least one respective approver to the set of continuations without performing coarse-grain cancellation with respect to other continuations in the set of continuations. Course-grain cancellation is an operation that cancels all continuations in the set of continuations in response to determining that the specified event occurs at step 206 and then adds the continuations that were in the set of continuations prior to performance of step 206 back into the set of continuations along with any new continuations. New continuations are continuations that were not in the set of continuations prior to performance of step 206 and that are to be added to the set of continuations based on occurrence of the specified event. Fine-grain cancellation, on the other hand, may be used to add any new continuations to the set of continuations without cancelling all continuations that were in the set of continuations prior to performance of step 206 and then adding those continuations back into the set of continuations.

In some example embodiments, one or more steps 202, 204, 206, and/or 208 of flowchart 200 may not be performed. Moreover, steps in addition to or in lieu of steps 202, 204, 206, and/or 208 may be performed. It will be recognized that actions performed in each step of flowchart 200 may be atomic. For instance, if step 202 is atomic, either all actions in step 202 are performed or none of the actions in step 202 are performed. If step 204 is atomic, either all actions in step 204 are performed or none of the actions in step 204 are performed, and so on.

In an example embodiment, instead of performing step 208 of flowchart 200, the steps of flowchart 300 in FIG. 3 are performed. As shown in FIG. 3, the method of flowchart 300 begins at step 302. In step 302, one or more continuations are removed from the set of continuations based on occurrence of the specified event. In an example implementation, modification module 506 removes the one or more continuations from the set of continuations. For instance, modification module 506 may remove the one or more continuations from the set of continuations in response to receipt of the modification instruction 516. In accordance with this implementation, modification module 506 may generate trigger instruction 518 in response to the one or more continuations being removed from the set of continuations. The trigger instruction 518 may indicate that the one or more continuations are removed from the set of continuations.

At step 304, performance of a cancellation action associated with at least one of the one or more continuations is triggered. A cancellation action is an action that is to be taken in response to one or more continuations being removed from a set of continuations. One example of a cancellation action is sending a message to person(s) affected by removal of the one or more continuations from the set of continuations. The message may indicate that the one or more continuations have been removed from the set of continuations. For instance, the message may indicate that the person(s) need not perform the one or more actions that are identified by the one or more respective continuations that are removed from the set of continuations. In an example implementation, triggering module 508 triggers the performance of the cancellation action. For example, triggering module 508 may trigger the performance of the cancellation action in response to receipt of the trigger instruction 518. In accordance with this example, the trigger instruction 518 may specify that the cancellation action is to be performed.

In an example embodiment, the events that are defined by the rules, which are identified by the set of continuations, correspond to approval of common subject matter by a set of respective approvers. In accordance with this embodiment, removal of the one or more continuations from the set of continuations at step 302 corresponds to removal of one or more respective approvers from the set of approvers. In an aspect of the embodiment, performance of the cancellation action may include sending a message (e.g., email, short message service (SMS), instant message (1M), etc.) to at least one of the one or more approvers (and/or boss(es) thereof) to specify that the one or more approvers are removed from the set of approvers.

In some example embodiments, one or more steps 302 and/or 304 of flowchart 300 may not be performed. Moreover, steps in addition to or in lieu of steps 302 and/or 304 may be performed.

In another example embodiment, instead of performing step 208 of flowchart 200, the steps of flowchart 400 in FIG. 4 are performed. As shown in FIG. 4, the method of flowchart 400 begins at step 402. In step 402, one or more continuations are added to the set of continuations based on occurrence of the specified event. In an example implementation, modification module 506 adds the one or more continuations to the set of continuations. For instance, modification module 506 may add the one or more continuations to the set of continuations in response to receipt of the modification instruction 516. In accordance with this implementation, modification module 506 may generate trigger instruction 518 in response to the one or more continuations being added to the set of continuations. The trigger instruction 518 may indicate that the one or more continuations are added to the set of continuations.

At step 404, performance of an initialization action associated with a designated continuation of the one or more continuations is triggered. For instance, the performance of the initialization action may be triggered in response to adding the one or more continuations to the set of continuations. An initialization action is an action that is to be taken in response to one or more continuations being added to a set of continuations. One example of an initialization action is sending a message to person(s) affected by addition of the one or more continuations to the set of continuations. The message may indicate that the one or more continuations have been added to the set of continuations. For instance, the message may indicate that the person(s) are to perform the one or more actions that are identified by the one or more respective continuations that are added to the set of continuations. It will be recognized that performance of any number of initialization actions associated with any number of designated continuations may be triggered at step 404. In an example implementation, triggering module 508 triggers the performance of the initialization action. For example, triggering module 508 may trigger the performance of the initialization action in response to receipt of the trigger instruction 518. In accordance with this example, the trigger instruction 518 may specify that the initialization action is to be performed. Triggering module 508 may generate a trigger confirmation 520 that indicates that performance of the initialization action is triggered and/or completed.

In an example embodiment, the events that are defined by the rules, which are identified by the set of continuations, correspond to approval of common subject matter by a set of respective approvers. In accordance with this embodiment, adding the one or more continuations to the set of continuations at step 402 corresponds to adding one or more respective approvers to the set of approvers. In an aspect of this embodiment, performance of the initialization action may include sending message(s) (e.g., email, short message service (SMS), instant message (IM), etc.) to designated approver(s) (and/or boss(es) thereof) to specify that the designated approver(s) are added to the set of approvers.

At step 406, monitoring is performed for an occurrence of a designated event that is defined by a rule that is identified by the designated continuation. For instance, the monitoring may be performed in response to triggering the performance of the initialization action. In accordance with the example embodiment described above with reference to step 404, step 406 may include monitoring for an occurrence of approval by a designated approver that is added to the set of approvers. In an example implementation, determination module 504 monitors for an occurrence of the designated event. For instance, determination module 504 may monitor for an occurrence of the designated event in response to receipt of the trigger confirmation 520.

In some example embodiments, one or more steps 402, 404, and/or 406 of flowchart 400 may not be performed. Moreover, steps in addition to or in lieu of steps 402, 404, and/or 406 may be performed.

It will be recognized that dynamic control flow module 500 may not include one or more of provision module 502, determination module 504, modification module 506, and/or triggering module 508. Furthermore, dynamic control flow module 500 may include modules in addition to or in lieu of provision module 502, determination module 504, modification module 506, and/or triggering module 508.

Continuation-based runtime module 108, dynamic control flow module 110, provision module 502, determination module 504, modification module 506, triggering module 508, flowchart 200, flowchart 300, and flowchart 400 may be implemented in hardware, software, firmware, or any combination thereof.

For example, continuation-based runtime module 108, dynamic control flow module 110, provision module 502, determination module 504, modification module 506, triggering module 508, flowchart 200, flowchart 300, and/or flowchart 400 may be implemented as computer program code configured to be executed in one or more processors.

In another example, continuation-based runtime module 108, dynamic control flow module 110, provision module 502, determination module 504, modification module 506, triggering module 508, flowchart 200, flowchart 300, and/or flowchart 400 may be implemented as hardware logic/electrical circuitry. For instance, in an embodiment, one or more of continuation-based runtime module 108, dynamic control flow module 110, provision module 502, determination module 504, modification module 506, triggering module 508, flowchart 200, flowchart 300, and/or flowchart 400 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

In an example embodiment, a programming model construct (e.g., activity) is generated that represents a step in a process that reacts to a set of events, which can change during execution of the programming model construct. In accordance with this embodiment, the programming model construct includes properties that may be configured (e.g., set) by a user to control a manner in which control flow steps with a set of mutable continuations is modeled and executed with fine-grained control over cancellation. The properties may include, for example, a list of values, a body, a body completed activity, and a control activity. Each value in the list of values represents an incoming event. A continuation is created for each incoming event. Each continuation identifies the event for which it is created and an action that is associated with that event.

The body includes business logic that is to be executed for each event that is represented in the list of values. Such business logic may be an activity that leverages a relatively highly composable and recursive nature of the continuation-based runtime. The body specifies the control flow and a selected continuation mechanism to schedule and react to each event. When an instance of the body finishes executing, the body completed activity is scheduled.

The body completed activity provides an opportunity to manipulate the set of pending events. For instance, new event(s) may be added to the set of pending events, and/or pending event(s) in the set may be cancelled, resulting in changes to the existing set of continuations.

The control activity allows for providing an activity that acts as a controller for the programming model construct during its entire execution. For example, the activity may expose and react to incoming events. In accordance with this example, the control activity is capable of handling administrative events.

It will be recognized that the programming model construct may be configured with any other existing continuation-based runtime construct (e.g., Sequence, Parallel, FlowChart, StateMachine, etc.) to create control policies to react to changes in the set of events during execution.

Figure 6:
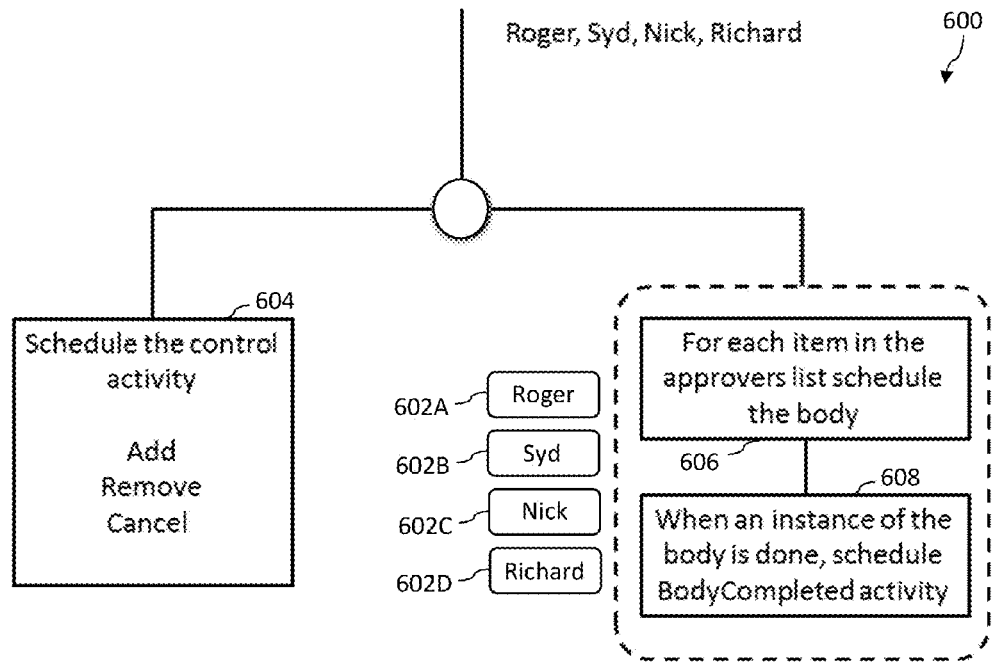
FIGS. 6 and 7 depict graphical representations of respective instances of a process in accordance with embodiments.
Figure 7:
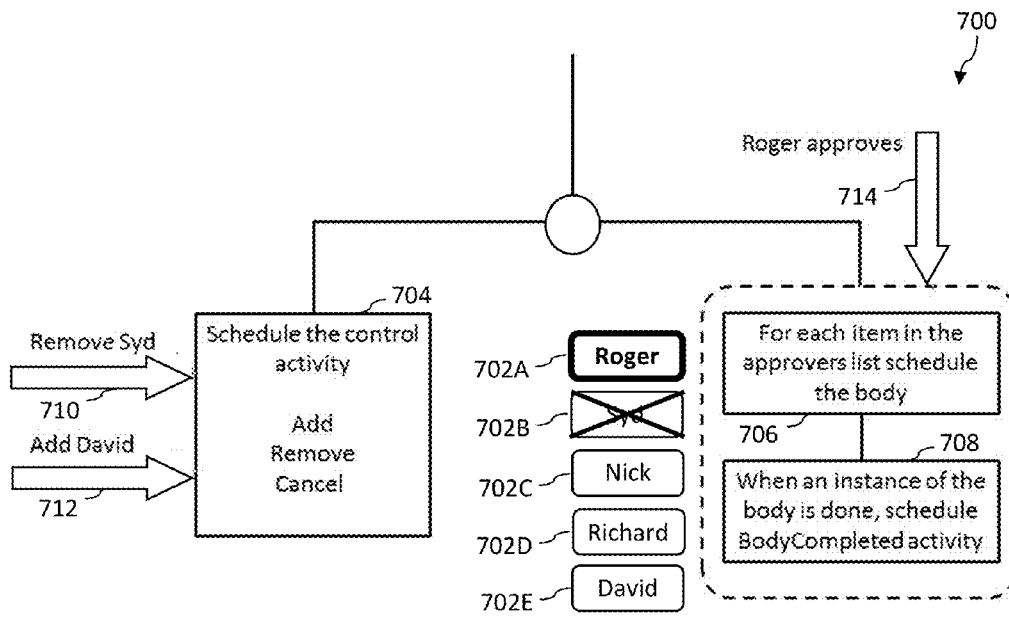

FIGS. 6 and 7 depict graphical representations 600 and 700 of respective instances of a process in accordance with embodiments. As shown in FIG. 6, graphical representation 600 includes a plurality of approver elements 602A-602D, a control activity element 604, a body element 606, and a body completed element 608. Approver elements 602A-602D identify Roger, Syd, Nick, and Richard, respectively, as being included in a list of approvers. For example Roger, Syd, Nick, and Richard may work for a company that has a document approval process that requires approval of a document by four engineers within the next five days. In accordance with this example, Roger, Syd, Nick, and Richard are the engineers who have been selected to approve the document. Approvals of the document by Roger, Syd, Nick, and Richard, respectively, correspond to respective incoming events. Control activity element 604 shows that approvers may be added to the list of approvers and/or removed from the list of approvers. Control activity element 604 also shows that the approval step may be cancelled altogether. Body element 606 indicates that the body is scheduled for each of the incoming events. For instance, an instance of the body is scheduled with regard to approval of the document by Roger; an instance of the body is scheduled with regard to approval of the document by Syd, and so on. Body completed element 608 indicates that the body completed activity is scheduled when each instance of the body finishes execution. It is noted that the programming model construct is monitoring business events (e.g., waiting for Roger, Syd, Nick, or Richard to participate in the process) and administrative events (e.g., adding a new approver, removing an approver, or cancelling the approval step).

For purposes of illustration, assume that Roger approves of the document right away, but Syd, Nick, and Richard decide to wait for a couple of days because they are busy with other tasks. During this time, Syd determines that he needs to be out of the office for a week to attend to a family emergency and therefore will be unable to participate in the process. The owner of the document decides to remove Syd from the list of approvers and add David as a replacement for Syd. The results of Roger's approval, Syd's removal, and David's addition are discussed below with reference to graphical representation 700 of FIG. 7.

As shown in FIG. 7, graphical representation 700 includes a plurality of approver elements 702A-702E, a control activity element 704, a body element 706, and a body completed element 708. Control activity element 704, body element 706, and body completed element 708 are functionally similar to control activity element 604, body element 606, and body completed element 608 of FIG. 6. Approver elements 702A-702E identify Roger, Syd, Nick, Richard, and David, respectively. An instruction is received from the owner of the document by the process for removing Syd from the list of approvers, as depicted by arrow 710. Accordingly, approver element 702B, which identifies Syd, is shown to be marked through with an X for illustrative purposes. An instruction is received from the owner of the document by the process for adding David to the list of approvers, as depicted by arrow 712. Accordingly, approver element 702E, which identifies David, is shown to be added in FIG. 7 as compared to FIG. 6. It will be recognized that removing Syd from the list of approvers and adding David to the list of approvers may be respective aspects of an atomic operation. If this is so, either Syd is removed and David is added, or Syd is not removed and David is not added.

An indication that Roger approves of the document is received by the process, as depicted by arrow 714. For purposes of illustration, it may be assumed that no indications have been received that indicate approval of the document by Nick, Richard, or David. Accordingly, approver element 702A, which identifies Roger, is distinguished from the other approver elements 702B-702E. For example, a value of a parameter associated with element 702A may be changed as compared to values of the parameter that are associated with the other respective approver elements 702B-702E. In accordance with this example, approver element 702 is shown to be bolded as compared to the other approver elements 702B-702E for illustrative purposes.

As depicted in FIG. 7, the process is waiting on Nick, Richard, and David to approve the document. Roger approved the document before Syd was replaced by David in the list of approvers, and Roger is unaware that Syd has been replaced by David because the replacement is not relevant to Roger. For instance, Roger is not notified that Syd is removed from the list of approvers, and the removal of Syd does not affect the previously received indication of Roger's approval of the document. Accordingly, Roger need not provide another approval of the document.

Scenarios such as those described above with reference to FIGS. 6 and 7 can be modeled with the programming model construct described in this document. The list of values in the programming model construct may initially include the original list of approvers (i.e., Roger, Syd, Nick, and Richard). The body may be configured to send an email to each approver and then wait for an approval message to be received from any approver in the list of approvers. When the body is completed, the body completed may check whether a necessary set of approvals has been received and adjust the set of continuations accordingly. An email may be sent to the requester (e.g., by adding an activity to send an email to the body completed activity). The control activity may be configured to listen to control events in parallel, waiting for additions and removals to the list of approvers or wholesale cancellation of the approval step. Once Roger approves the document, an email may be sent to the document owner, and the event the corresponds to Roger may be removed from the set of events. When Syd is to be removed and David is to be added, two messages may be sent to the control activity. For instance, a first message may specify that the event corresponding to Syd is to be removed from the set of events, resulting in cancellation of the body instance that waits for Syd's approval. The second message may specify that an event corresponding to David is to be added to the set of events, resulting in scheduling the body to wait for David's approval.

The programming model construct is a control flow construct that may be composed with any other existing activity to model programs declaratively in a continuation-based runtime. The outcome of the solution can be an relatively high-level (a.k.a. up-leveled) authoring experience for describing programs that control the set of continuations to which the programs react with fine grained control over cancellation of continuations and that allow external control messages that can mutate the set of continuations. This experience is applicable to a variety of environments, such as visual programming environments used for workflows or pipelines. It will be recognized that up-leveled authoring experiences can take different forms to accommodate the needs of different domains.

Figure 8:
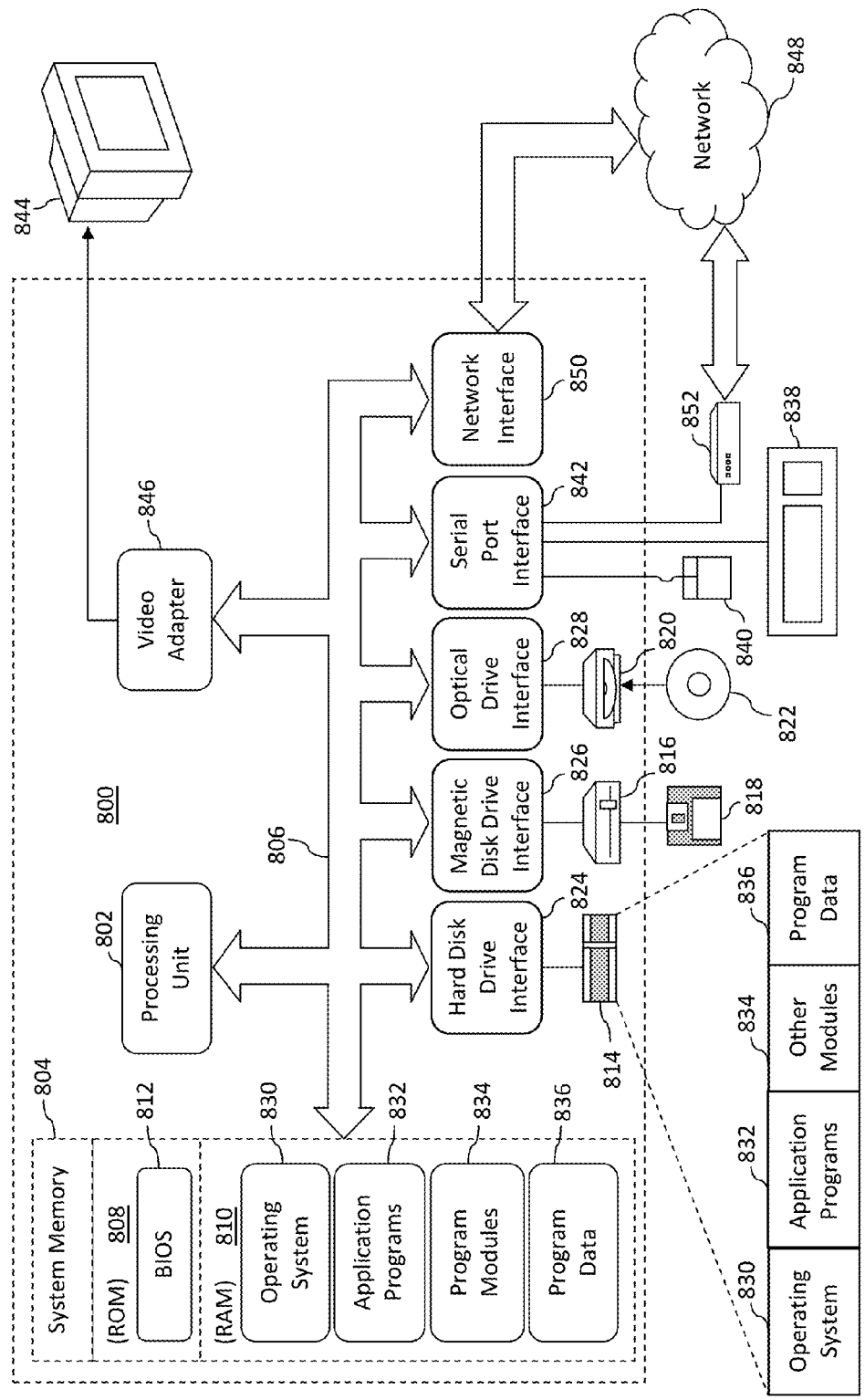
FIG. 8 depicts an example computer in which embodiments may be implemented.

FIG. 8 depicts an example computer 800 in which embodiments may be implemented. Any one or more of the clients 102A-102M or any one or more of servers 106A-106N shown in FIG. 1 (or any one or more subcomponents thereof shown in FIGS. 1 and 5) may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing continuation-based runtime module 108, dynamic control flow module 110, provision module 502, determination module 504, modification module 506, triggering module 508, flowchart 200 (including any step of flowchart 200), flowchart 300 (including any step of flowchart 300), and/or flowchart 400 (including any step of flowchart 400), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable medium" are used to generally refer to media such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Example Code Snippets

Following are two example code snippets, labeled "Example Code Snippet #1" and "Example Code Snippet #2", respectively.

A. Example Code Snippet #1

The code snippet below demonstrates a possible interface for a programming model construct activity:

```
public sealed class DynamicForEach<T> : NativeActivity
{
  public DynamicForEach( )
  public DynamicForEach(InArgument<IDictionary<string, T>> values)
  // set of initial values - for each value, a new instance of the body will
  be scheduled
  [RequiredArgument]
  public InArgument<IDictionary<string, T>> Values
  {
    get; set;
  }
  // handler for updating the set of values / reacting to control events
  public ActivityAction<IDictionary<string, T>> UpdateValues
  {
    get; set;
  }
  // logic to be executed for every value in the values collection
  public ActivityAction<string, T> Body
  {
    get; set;
  }
  // logic to be executed when the body is completed - it provides the
  // opportunity to manipulate the list of values resulting in new
  // continuations being created or existing being removed
  public ActivityAction<string, T, IDictionary<string, T>>
  BodyCompleted
  {
    get; set;
  }
}
```

B. Example Code Snippet #2

The following code snippet demonstrates an example use of the programming model construct to model an approvers process (e.g., human workflow). Use of the programming model construct is shown between the comments "BEGIN OF Approval Step" and "END OF Approval Step".

```
DelegateInArgument<string> workId = new DelegateInArgument<string>( );
DelegateInArgument<string> workState = new DelegateInArgument<string>( );
Variable<string> approver = new Variable<string>("approver");
Variable<string> workData = new Variable<string>("workData");
Variable<string> initialApprovers = new Variable<string>("initialApprovers");
Variable<string[ ]> listOfInitialApprovers = new
Variable<string[ ]>("listOfInitialApprovers");
DelegateInArgument<string> initialApprover = new
DelegateInArgument<string>("initialApprover");
Variable<Collection<string>> finalApprovers = new
Variable<Collection<string>>("finalApprovers");
DelegateInArgument<string> finalApprover = new
DelegateInArgument<string>("finalApprover");
Variable<IDictionary<string, string>> initialWork = new
Variable<IDictionary<string, string>>("initialWork");
DelegateInArgument<IDictionary<string, string>> updateValuesArgument = new
DelegateInArgument<IDictionary<string, string>>("updateValuesArgument");
return new Sequence
{
   Variables = { initialApprovers, listOfInitialApprovers, finalApprovers, initialWork
},
   Activities =
   {
     // initialize the collection that holds the approval results
     new New<Collection<string>> { Result = finalApprovers },
     // get the list of approvers from the user
     new WaitForEvent { BookmarkName = "Approvers", Result = initialApprovers
},
     new SplitString
     {
        Input = initialApprovers,
        Separator = ";",
        Result = listOfInitialApprovers
     },
     // create the list of initial work to be done based on the list of approvers provided
     // above
     new CreateDictionary<string, string>
     {
        Result = initialWork,
     },
     new ForEach<string>
     {
        Values = listOfInitialApprovers,
```

```
            Body = new ActivityAction<string>
            {
               Argument = initialApprover,
               Handler = new AddToDictionary<string, string>
               {
                  Dictionary = initialWork,
                  Key = initialApprover,
                  Value = "",
               }
            }
         },
         // -------------------------------------
         // BEGIN OF Approval Step...
         // -------------------------------------
         new DynamicForEach<string>
         {
            // set the list of initial work to be done
            Values = initialWork,
            // configure the action to respond to control events. In this case, it will be
            // listening to incoming messages in parallel and update the list of work to be
            // done according with the message received. Accepted messages are
            // "AddApprover", "RemoveApprover" and "CancelApprovalProces"
            UpdateValues = new ActivityAction<IDictionary<string, string>>
               {
                  Argument = updateValuesArgument,
                  Handler = new Sequence
                  {
                     Variables = { approver },
                     Activities =
                     {
                        // wait for control events in parallel - the pattern is "Wait and modify
                        // the list of work to be done according with the input message"
                        new Parallel
                        {
                           CompletionCondition = true,
                           Branches =
                           {
                              new Sequence
                              {
                                 Activities =
                                 {
                                    new WaitForEvent { Event = "Add", Result = approver, },
                                    new AddToDictionary<string, string>
                                    {
                                       Dictionary = updateValuesArgument,
                                       Key = approver,
                                       Value = "",
                                    },
                                 }
                              },
                              new Sequence
                              {
                                 Activities =
                                 {
                                    new WaitForEvent { Event = "Remove", Result = approver new RemoveFromDictionary<string, string>
                                    {
                                       Dictionary = updateValuesArgument,
                                       Key = approver,
                                    },
                                 }
                              },
                              new Sequence
                              {
                                 Activities =
                                 {
                                    new WaitForEvent { Event = "CancelApprovalProcess" },
                                    new ClearDictionary<string, string>
                                    {
                                       Dictionary = updateValuesArgument,
                                    },
                                 }
                              }
                           }
                        },
                     },
                  },
               },
```

```
                  // this is the logic that will be executed for every element in the list of work to
                  // be done. In this case it will be waiting for incoming messages and updating
                  // the list of received approvals
                  Body = new ActivityAction<string, string>
                  {
                    Argument1 = workId,
                    Argument2 = workState,
                    Handler = new CancellationScope
                    {
                      Body = new Sequence
                      {
                        Variables = { workData },
                        Activities =
                        {
                          new WaitForEvent { BookmarkName = workId, Result = workData,
},
                          new AddToCollection<string>
                          {
                            Collection = finalApprovers,
                            Item = workId,
                          },
                        }
                      },
                      CancellationHandler = new Sequence
                      {
                        Activities =
                        {
                          new WriteLine { Text = new ConcatString { Inputs = { workId, ",
your approval is no longer required.\n" } } },
                        }
                      },
                    },
                  },
            // -------------------------------------
            // END OF Approval Step...
            // -------------------------------------
            // at this point the approval is completed, printing a message in the string and
            // showing the list of approvers
            new WriteLine { Text = "The document was approved. The final approvers
were:" },
            new ForEach<string>
            {
              Values = finalApprovers,
              Body = new ActivityAction<string>
              {
                Argument = finalApprover,
                Handler = new Sequence
                {
                  Activities =
                  {
                    new WriteLine { Text = finalApprover },
                  }
                }
              }
            },
          }
        }
```

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method of executing a computer program in accordance with a declarative dynamic control flow in a continuation-based runtime, the method comprising:

providing, using at least one processor or at least one integrated circuit, a representation of logic that corresponds to the declarative dynamic control flow in accordance with execution of the computer program in the continuation-based runtime, the declarative dynamic control flow identifying a set of continuations, the set of continuations identifying a plurality of respective rules that define a plurality of respective events and a plurality of respective actions that are to be performed upon occurrence of the plurality of respective events;

determining that a specified event occurs; and dynamically modifying the set of continuations based on occurrence of the specified event.

2. The method of claim 1, wherein dynamically modifying the set of continuations comprises:

removing one or more continuations from the set of continuations based on occurrence of the specified event.

3. The method of claim 2, further comprising:
triggering performance of a cancellation action associated with at least one of the one or more continuations in response to removing the one or more continuations from the set of continuations.

4. The method of claim 1, wherein dynamically modifying the set of continuations comprises:
adding one or more continuations to the set of continuations based on occurrence of the specified event.

5. The method of claim 4, further comprising:
triggering performance of an initialization action associated with a designated continuation of the one or more continuations in response to adding the one or more continuations to the set of continuations; and
monitoring for an occurrence of a designated event that is defined by a rule that is identified by the designated continuation in response to triggering the performance of the initialization action.

6. The method of claim 1, wherein providing the representation of the logic comprises:
providing a graphical representation of the logic.

7. The method of claim 1, wherein providing the representation of the logic comprises:
providing a text-based representation of the logic.

8. The method of claim 1, wherein determining that the specified event occurs comprises:
determining that an administrative event occurs, the administrative event being an event that is defined by a rule associated with the declarative dynamic control flow but that is not defined by a rule that is identified by a dynamic continuation in the set of continuations.

9. The method of claim 1, wherein dynamically modifying the set of continuations comprises:
dynamically modifying a first subset of the continuations in the set of continuations and not a second subset of the continuations in the set of continuations based on occurrence of the specified event.

10. The method of claim 1, wherein the plurality of events corresponds to approval of common subject matter by a set of respective approvers; and
wherein determining that the specified event occurs comprises:
determining that the set of approvers is modified.

11. The method of claim 10, wherein determining that the set of approvers is modified comprises:
determining that one or more first approvers and not one or more second approvers are removed from the set of approvers; and
wherein dynamically modifying the set of continuations comprises:
removing one or more first continuations that correspond to the one or more respective first approvers but not one or more second continuations that correspond to the one or more respective second approvers from the set of continuations.

12. The method of claim 10, wherein determining that the set of approvers is modified comprises:
determining that at least one approver is added to the set of approvers; and
wherein dynamically modifying the set of continuations comprises:
adding at least one continuation that corresponds to the at least one respective approver to the set of continuations without performing coarse-grain cancellation with respect to other continuations in the set of continuations.

13. The method of claim 1, further comprising:
monitoring information received by the computer program for indications of occurrences of business events and for indications of occurrences of administrative events simultaneously, each business event being an event that is defined by a respective rule that is identified by a respective dynamic continuation in the set of continuations, each administrative event being an event that is defined by a rule associated with the declarative dynamic control flow but that is not defined by a rule that is identified by a dynamic continuation in the set of continuations;
wherein determining that the specified event occurs comprises:
determining that the specified event occurs in response to monitoring the information received by the computer program.

14. A system to execute a computer program in accordance with a declarative dynamic control flow in a continuation-based runtime, the system comprising:
at least one of one or more processors or one or more integrated circuits that implement:
a provision module configured to provide a graphical representation of logic that corresponds to the declarative dynamic control flow in accordance with execution of the computer program in the continuation-based runtime, the declarative dynamic control flow identifying a set of continuations, the set of continuations identifying a plurality of respective rules that define a plurality of respective events and a plurality of respective actions that are to be performed upon occurrence of the plurality of respective events;
a determination module configured to determine whether a specified event occurs; and
a modification module configured to dynamically modify the set of continuations in response to occurrence of the specified event.

15. The system of claim 14, wherein the modification module is configured to dynamically remove one or more continuations from the set of continuations in response to occurrence of the specified event; and
wherein the system further comprises:
a triggering module configured to trigger performance of a cancellation action associated with at least one of the one or more continuations in response to the one or more continuations being removed from the set of continuations.

16. The system of claim 14, wherein the modification module is configured to dynamically add one or more continuations to the set of continuations in response to occurrence of the specified event;
wherein the system further comprises:
a trigger module configured to trigger performance of an initialization action associated with a designated continuation of the one or more continuations in response to the one or more continuations being added to the set of continuations; and
wherein the determination logic is configured to monitor for an occurrence of a designated event that is defined by a rule that is identified by the designated continuation in response to the performance of the initialization action being triggered.

17. The system of claim 14, wherein the specified event is an administrative event, the administrative event being an event that is defined by a rule associated with the declarative dynamic control flow but that is not defined by a rule that is identified by a dynamic continuation in the set of continuations.

18. The system of claim 14, wherein the modification module is configured to dynamically modify a first subset of the continuations in the set of continuations and not a second subset of the continuations in the set of continuations in response to occurrence of the specified event.

19. The system of claim 14, wherein the determination module is configured to monitor information received by the computer program for indications of occurrences of business events and for indications of occurrences of administrative events simultaneously, each business event being an event that is defined by a respective rule that is identified by a respective dynamic continuation in the set of continuations, each administrative event being an event that is defined by a rule associated with the declarative dynamic control flow but that is not defined by a rule that is identified by a dynamic continuation in the set of continuations.

20. A computer program product comprising a computer-readable storage medium having computer program logic recorded thereon for enabling a processor-based system to execute a computer program in accordance with a declarative dynamic control flow in a continuation-based runtime, the computer program product comprising:
- a first program logic module for enabling the processor-based system to provide a graphical representation of logic that corresponds to the declarative dynamic control flow in accordance with execution of the computer program in the continuation-based runtime, the declarative dynamic control flow identifying a set of continuations, the set of continuations identifying a plurality of respective rules that define a plurality of respective events and a plurality of respective actions that are to be performed upon occurrence of the plurality of respective events, the plurality of events corresponding to approval of common subject matter by a set of respective approvers;
- a second program logic module for enabling the processor-based system to determine whether the set of approvers is modified; and
- a third program logic module for enabling the processor-based system to dynamically modify the set of continuations in response to the set of approvers being modified.

* * * * *